June 7, 1966 W. A. PLUMMER 3,254,678
DETACHABLE TUBULAR JACKETING
Filed Jan. 2, 1964 2 Sheets-Sheet 1

*INVENTOR.*
WALTER A. PLUMMER
BY
ATTORNEY.

June 7, 1966   W. A. PLUMMER   3,254,678
DETACHABLE TUBULAR JACKETING
Filed Jan. 2, 1964   2 Sheets-Sheet 2
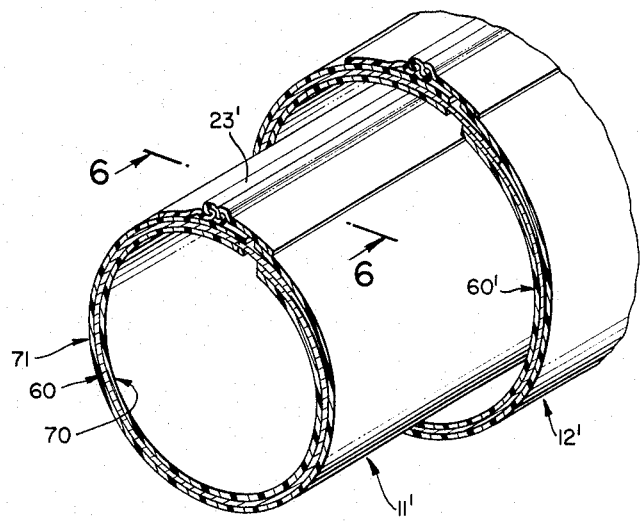
FIG. 5.
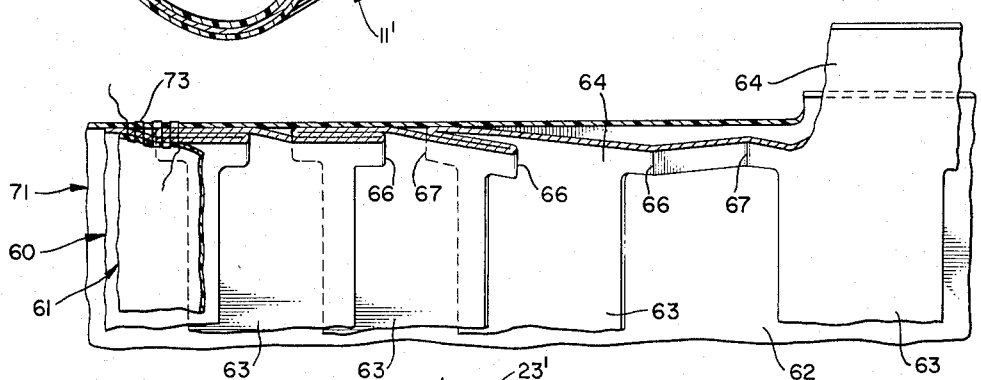
FIG. 7.
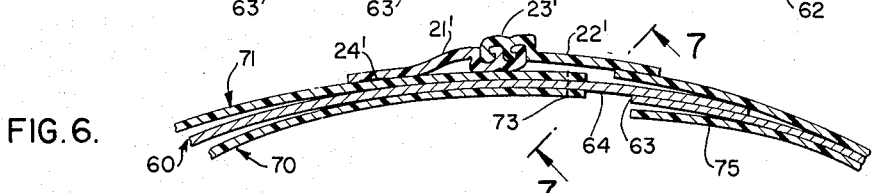
FIG. 6.
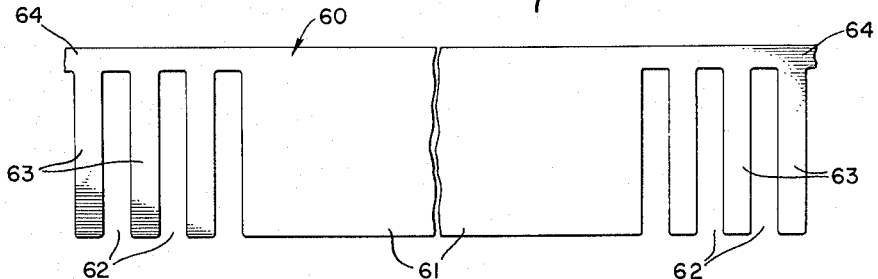
FIG. 8.
WALTER A. PLUMMER
INVENTOR.
BY
ATTORNEY

United States Patent Office

3,254,678
Patented June 7, 1966

3,254,678
DETACHABLE TUBULAR JACKETING
Walter A. Plummer, 3546 Crownridge Drive,
Sherman Oaks, Calif.
Filed Jan. 2, 1964, Ser. No. 337,707
11 Claims. (Cl. 138—139)

This application is a continuation-in-part of copending application Serial No. 59,024, filed September 28, 1960, and now abandoned.

This invention relates to jacketing for conduits, cables, wiring and the like and more particularly to jacketing constructions incorporating a thin flexible metal body to which is loosely attached or bonded substantially fluid-tight nonmetallic seam-forming means by which the jacketing may be held detachably assembled about elongated objects and more particularly cabling, wiring, conduits and other structures for a great variety of purposes including mechanical protection as well as a shielding barrier against the passage of various types of electrical noise including both electrostatic and electromagnetic.

It is well known that protection of electrical circuits and other components from the undesirable effects of flux fields and "noise" involves embracing the elements by metallic barriers effective to intercept such fields and to ground them. It is also known that certain metals and materials have varying degrees of effectiveness within different frequency ranges of the noise sought to be controlled. For example, copper and aluminum foil or fine mesh wire screen of these materials are highly effective in protecting components from electrical fields, particularly those produced by the higher frequencies such as those ranging between 150 kc. and 1000 mc. Certain other flux fields such as those ranging between 10 and 100 kc. are far more effectively shielded by barriers formed of other metals, each being selectively effective in protecting components from flux fields within different frequency ranges.

Some of these metals have properties making their use somewhat difficult and troublesome owing to their high resistance to bending and forming because of their resilience and toughness. Modes heretofore proposed for utilizing thin sheets of these metals in the effective and efficient shielding of cables, ducting, and housings for electrical components have been subject to many objections and disadvantages. These are overcome to a highly satisfactory degree by the present invention making use of long strips of the particular metal required for shielding purposes and having easily closed and opened seam means attached to one or both lateral edges of the stripping in such manner as to hold the jacketing snugly assembled tubular-fashion with the adjacent edges of the metal shield in firm overlapping contact. In this manner assurance is provided of a complete tubular enclosure formed of the requisite metal free of gaps and electrical discontinuities so essential to effective shielding of the parts being protected.

One of the troublesome disadvantages of the sheet metal most effective as a barrier for low frequency noise is the pronounced rigidity of the metallic component of the jacketing when assembled about components such as cabling. This rigidity renders handling difficult and interferes seriously with flexing of the cabling so frequently desirable during installation inspection and servicing.

These needs not provided for in prior shielded jacket constructions are achieved to an eminently satisfactory degree by forming the metal components in ringlets in overlapping end contact with one another and also desirably transversely split to permit the jacket to be assembled from the side. In the interests of economy the jacketing is provided with alternate lengths of nested rings and long split cylindrical sections, the former being used on cabling having need for flexing and the latter on adjacent lengths lacking need for flexing. Control and ease of handling of the ringlets is facilitated by keeping the ringlets interconnected by an integral junction strip extending crosswise therebetween, as across one of their transverse ends as will be described below. This strip is then pleated or appropriately gathered so that the axial end edges of the ringlets overlap sufficiently to assure a continuous metal barrier in the flexed condition of the jacketing.

Oftentimes, the shielding metal is itself in need of protection against corrosive fluids or from the possibility of contact with electrical conductors. In this event, the fluid-tight seam-forming means preferably includes an outer layer or jacket of electrical non-conductive material compounded to be immune to attack by the corrosive fluids and cooperating with the seam means proper in holding the nonconducting layer and the metal layer compactly closed about the object to be protected.

It is found that the shielding effectiveness can be greatly enhanced by employing separate superimposed layers as distinguished from the same amount of metal in a single thicker layer. This characteristic is utilized advantageously according to this invention by using multiple jacket assemblies arranged concentrically of one another and each having a thin layer of a selected one of the flux barrier metals and mutually cooperating to provide a flux barrier many times as effective as that of any one of the assemblies.

Accordingly, it is a primary object of the present invention to provide a novel protective tubular jacketing assembly having a main body formed at least in major part of metal and adapted to be detachably assembled by longitudinal seam means secured to at least one lateral edge portion of the metallic body.

Another object of the invention is the provision of tubular jacketing having a thin flexible main body of sheet metal having articular sections in overlapping contacting relation adapted to be held closed by plastic seam means having complementally shaped mating parts.

Another object of the invention is the provision of a protective jacketing assembly comprising a tubular metal layer and a surrounding flexible nonconducting layer the opposite lateral edges of which are formed to interlock with one another to form a fluid-tight seam effective to hold both layers assembled in tubular form.

Another object of the invention is the provision of tubular electrically conductive jacketing providing an effective shield against electrical fields of a particular frequency range and consisting essentially of an inner metal layer and an outer protective layer of nonmetallic material bonded to a portion only of the underlying metal layer to avoid interfering with the metal-to-metal contact of the overlapped lateral edges of the metal and wherein the entire assembly is adapted to be held separably assembled by a single longitudinal seam.

Another object of the invention is the provision of a tubular shielding assembly for electrical components and including a plurality of thin flexible layers of metal and nonmetallic layers concentrically assembled and characterized by the fact that the opposite edges of the metal layers are in overlapping contact with one another and wherein each of the nonmetallic layers includes readily openable and closable longitudinally extending seams.

Another object of the invention is the provision of a flux barrier assembly adapted to be wrapped into a tube capable of being flexed and twisted and utilizing as its active barrier component a series of thin resilient metal members arranged with their adjacent edges in overlapping wiping relationship to provide a continuous metallic barrier of tubular configuration throughout wide range flxing and twisting of the assembly.

Another object of the invention is the provision of a tubular flux barrier assembly adapted to be applied about cabling and the like from one side thereof and featuring a continuous metallic enclosure formed by a series of sheet metal members held assembled with their edges in wiping overlapping relation with said metal members sandwiched between thin flexible layers of sheet plastic one of which is equipped with closure means for holding said barrier assembly snugly in place about the cabling.

These and other more specific objects will appear upon reading the following specification and claims and upon considering in connection therewith the attached drawing to which they relate.

Referring now to the drawing in which preferred embodiments of the invention are illustrated.

FIGURE 5 is a view similar to FIGURE 1 of a third preferred embodiment of the invention;

FIGURE 6 is a fragmentary cross-sectional view on an enlarged scale taken along line 6—6 on FIGURE 5;

FIGURE 7 is a fragmentary view taken longitudinally of the jacketing and along a broken line in the zone generally indicated by line 7—7 on FIGURE 6 and showing the pleated metal layer in process of assembly between the sheet plastic layers; and FIGURE 8 is a plan view of the sheet metal as prepared from a continuous strip thereof and prior to pleating to bring the transverse edges into overlapping relation.

Figure 1:
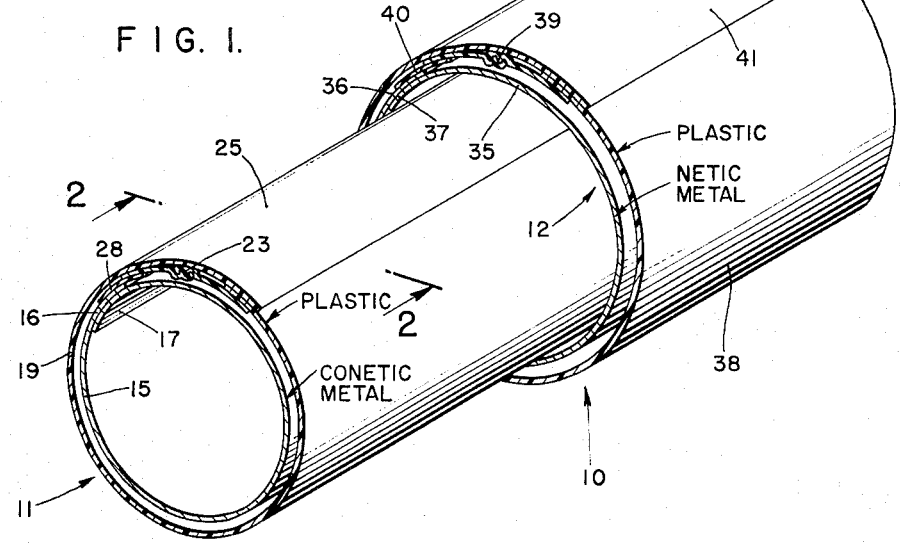
FIGURE 1 is a fragmentary perspective view of one preferred embodiment of the invention shown in assembled condition and with the thicknesses and spacing between parts exaggerated for clarity of illustration.
Figure 2:
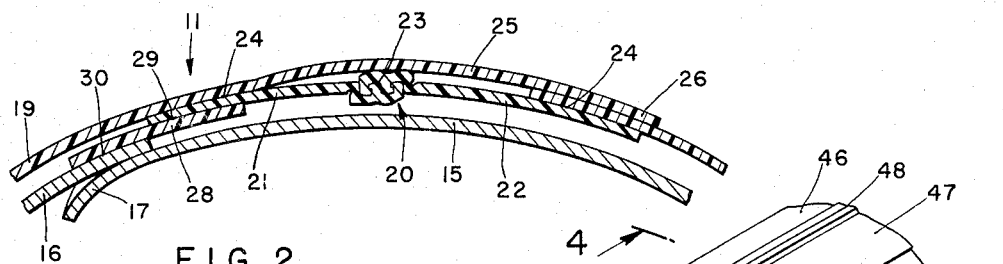
FIGURE 2 is a fragmentary cross-sectional view on an enlarged scale and taken along line 2—2 on FIGURE 1.

Referring more particularly to FIGURES 1 and 2, there is shown one preferred embodiment of the jacketing assembly designated generally 10 and comprising two independent jackets 11 and 12. Inner jacket 11 includes a tubular shell 15 of thin flexible metal approximately 3 to 5 mils thick and selected for its effectiveness as a barrier or shield against penetration of flux fields within a particular frequency range. Metal sold in commerce by Perfection Mica Co., Chicago, Illinois, under the trade name "Co-Netic" is one example, while the metal "Netic" sold by the same manufacturer is a second. These two metals are effective shields against flux fields of different frequency ranges whereas copper and aluminum are effective shields at other and higher frequency ranges. In the assembled position of jacket 11, the opposite lateral edges 16 and 17 of shell 15 overlap and lie in intimate wiping surface contact with one another, the corner of edge 17 being shown deflected inwardly in FIGURE 2 to indicate that the overlapped contacting surfaces are not attached to one another; it will be understood their adjacent surfaces normally lie in intimate conductive contact with one another.

A suitable arrangement for holding shell 15 properly assembled and protected comprises an outer cover 19 of electrically non-conducting material as, for example, a suitable thin flexible impervious sheet plastic, such as a polyethylene or polyvinyl chloride composition. However, it is to be understood that other materials having similar properties may be employed, including the elastomers and related supple pliant plastics. Exterior covering 19 not only conceals and snugly embraces shielding shell proper 15 but it also carries fluid-tight seam-forming means by which the shielding shell 15 may be held assembled. As here shown by way of example, seam assembly 20 is formed by a pair of identical tapes 21, 22 of extruded plastic material having continuous interfitting complementary shaped tongues and grooves 23 along their free edges which mate with one another in the closed position of the seam to provide a fluid-tight seam. The remotely located edges of tapes 21, 22 are heat fused or otherwise suitably bonded at 24, 24 to longiutdinal opposed edge portions of covering 19, and desirably in such a manner as to provide an exterior guard flap 25 sufficiently wide to overlie and conceal tapes 21 and 22, it being understood that the free edge 26 of the guard flap may be, but usually is not, adhesively bonded to the underlying portion of covering 19.

Tape 21 may be bonded directly to edge 16 of shell 15 although, for convenience in the assembly of the outer convering 11 to the Co-Netic shell, it is preferably to employ an attachment strip 28 of plastic material the latter being fuse-bonded at 29 to tape 21 or to the inner surface of covering 19. The underside of its other edge is bonded along a narrow strip or band 30 (FIGURE 2) to edge portion 16 of shell 15. The bonding of strip 28 to the metal shell is accomplished as by inserting between the parts to be joined a heat bondable tape commerically available on the market. After insertion of the bonding tape between the juxtaposed surfaces of the metal and strip 28, these components are pressed together under heat of the requisite temperature to effect fusing of the bonding tape and so held until the parts cool. An extremely strong bond is thus formed incapable of being separated without destruction of the parts themselves. By this means the outer protective jacketing 11 is held assembled to Co-Netic shell 15 the circumference of the outer jacket being such that in the closed portion of seam 20 the overlapping portions 16 and 17 of shell 15 are held pressed against one another and against the underlying cabling or other components to be protected and shielded against flux fields. It will also be understood that junction 30 between metal layer 16 and strip 28 may be provided by stitching.

Outer jacket assembly 12 is constructed similarly to jacket assembly 11 and comprises an inner shell 35 of Netic or other suitable flux field shielding metal of 3 to 5 mils thick, although it will be understood that these dimensions are not critical and may be extended to either side of this range. This shell likewise has overlapping edges 36, 37 in firm electrically conductive contact with one another. Shell 35 is assembled to a similar exterior covering of plastic or the like 38 provided with seam means 39 secured to edge portion 36 of shell 35 by a plastic strip 40 in the same manner described in connection with jacket 11. Outer covering 38 is likewise preferably provided with a guard flap 41 sufficiently wide to overlap and conceal seam 39.

The assembly of the dual jacketing assembly 10 will be quite apparent from the showing in FIGURE 1. Thus, if a cable of wires or other components desired to be shielded from flux fields within the shielding range capabilities of shields 15 and 35, respectively, are to be protected, inner jacket 11 has its seam 20 opened in order that the component parts can be spread apart for the assembly operation. If the cabling is of smaller diameter than the maximum effective diameter of shell 15 when closed to the position shown in FIGURE 1, a snug fitting assembly is obtained by assemblying jacketing 10 spirally and in the pitch required for a snug fit. In this connection, it is pointed out that despite the fact that metal shell 15 is inelastic a given jacket assembly will fit a wide range of cable diameters equally snugly by the simple expedient of applying the jacket to the cable with the appropriate spiral pitch, an advantage and characteristic of considerable practical importance for readily apparent reasons. Not only are overlapping edges 16 and 17 of shell 15 pressed firmly against one another as well as snugly against the exterior of the cable being protected, but a compact, neat appearing and efficient jacket assembly results irrespective of variations in cable diameters.

It will be understood that the outer protective cable cover 19 is closed by pressing together tongues and grooves 23, either by finger pressure or by the use of a suitable pull tab closure device of a well known type commonly employed with interlocking slide fastener seams of the type here illustrated. The assembly of the inner jacket is completed by pressing guard flap 25 across closed seam 20. If the assembly is applied in a spiral manner as it preferably is for a snug fit, then this spiraling assembly acts automatically to hold the guard flap closed for self-apparent reasons. After the inner jacket 11 has been assembled, outer jacket assembly 12 is similarly snugly assembled about jacket 11 and its seam 39 is closed in the same manner.

Figure 3:
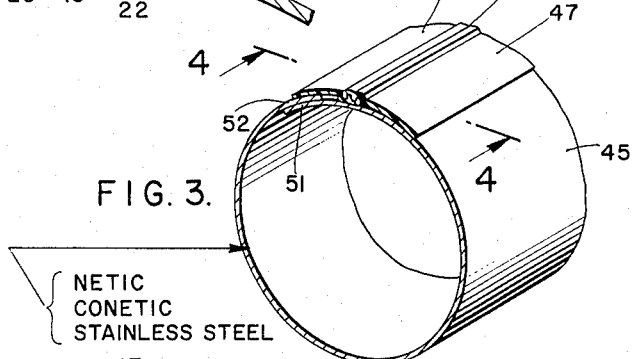
FIGURE 3 is a fragmentary perspective view of a simplified embodiment of the invention.
Figure 4:
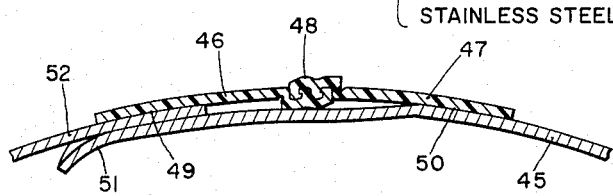
FIGURE 4 is a fragmentary enlarged sectional view taken along line 4—4 on FIGURE 3.

Referring now to a second and simpler preferred embodiment of the invention illustrated in FIGURES 3 and 4, it will be understood that the jacket proper comprises a tubular shell of flexible metal 45 of any desired material including stainless steel, aluminum, copper and others having the requisite thickness to provide the desired degree of protection. Usually a thickness of 3 to 8 mils is adequate for flux field shielding purposes, although considerably greater thicknesses are often employed where the shell is also used for mechanical or armor protection as well. It will be understood that shell 45 may comprise either Netic or Co-Netic metal if it is desired to use the shell for electrical field shielding purposes within the frequency range capabilities of these metals.

Shell 45 is similar to shells 15 and 35 described above in connection with FIGURES 1 and 2. The means provided for holding the metal shell separably closed about components to be protected, such as cabling or otherwise, comprises a pair of plastic tapes 46, 47 provided with interfitting parts desirably of plastic material. The remote edges of tapes 46, 47 are adhesively bonded to the exterior lateral edges of shell 45, as indicated at 49 and 50, by means of a heat bondable tape of the same type referred to above in connection with FIGURES 1 and 2. These are so secured to the shell that the opposite edges 51, 52 of the shell are in overlapping contact when seam 43 is closed.

The second embodiment is assembled to parts to be protected in the same manner described above and it will be understood that the metal shells of all embodiments may be and preferably are grounded in accordance with customary practice in shielding operations.

A third embodiment of the invention illustrated in FIGURES 5 to 8, though differing from that shown in FIGURES 1 and 2 in various respects, is generally similar to the first described set of superimposed but independent jacket assemblies. The principal difference resides in the fact that the metallic layer of each jacket is specially formed to render at least portions if not all of its length substantially more flexible than the metal layer of the first described embodiment. According to a preferred arrangement, the barrier layer comprises a metallic strip 60 stamped, die cut or otherwise formed to exhibit the configuration typically shown in FIGURE 8 and preferably includes a long section 61 free of transverse notches located either at one end of or between sections having deep notches 62 forming plates or fingers 63 integral with one another and with portion 61 through a relatively narrow connector strip 64 extending continuously along one lateral edge of metal strip 60. Desirably, fingers 63 have the same width as notches 62. This has the advantage that two notched strips of metallic material may be formed simultaneously from a strip of material only slightly wider than that shown in FIGURE 8 thereby avoiding waste of the material cut away in forming notches 62. It will be understood that the notched and unnotched lengths of stripping 60 will be chosen to correspond with lengths of cabling having need respectively for flexible and nonflexible jacketing. In other words, straight sections of cabling not subject to flexing in their operating environment can be advantageously enclosed by unnotched lengths 61 of metal stripping, whereas sections of cabling having need for flexing during or after assembly of the jacketing thereabout will be enclosed by the notched metal stripping.

Prior to assembly of the prepared metal stripping 60 between layers of strip sheet plastic material, the metal strip 60 is pleated or folded transversely of connector strip 64 in such manner that the edges of adjacent fingers 63 are brought into overlapping close-wiping relation as is illustrated at the left-hand end of FIGURE 7. The two fingers 63 shown at the right-hand end of this figure are substantially fully separated but the portion of connector strip 64 lying therebetween has been oppositely creased or scored, as indicated at 66, 67 to facilitate pleating of this strip in the manner clearly illustrated at the left-hand end of FIGURE 7. This operation may be performed by the aid of any suitable forming tools or jigs. As initially made, the resulting structure will lie substantially flat with all overlapping surfaces in close wiping contact with one another and with each of the component fingers held flexibly in assembled position by the pleated connector strip 64. When the opposite lateral edges of the completed strip have been rolled into a tube with the free ends or margins of fingers 63 overlapping and in wiping contact with connector strip 64, the resulting tubular structure may be appropriately described as an articulated tube formed of transversely split ringlets having their opposite axial ends of margins and their opposite transverse ends or edges in overlapping contacting relationship. This same description also applies to the opposite axial margins as well as to the opposite lateral edges of the unnotched section 61 when formed into a tube. In other words, the unnotched section may be viewed merely as a much wider ringlet than those formed by fingers 63.

The pleated metal barrier strip 60 is assembled to at least one and preferably between inner and outer layers of flexible sheet plastic material 70, 71 as by one or more rows of stitching 73 confined to a narrow band extending lengthwise of metal connector strip 64 in an area closely spaced to the inner ends of notches 62. In other words, it is advantageous for stitching 73 to be spaced well inwardly from the outer lateral edge of strip 64 and closely adjacent the same set of edges of plastic strips 70 and 71. In consequence, both a major portion of the inner and outer surfaces of strip 64 project beyond the edges of plastic strips 70 and 71 to the end that the free ends of fingers 63 may be brought into overlapping relation with either the interior or exterior surface of strip 64 to provide an electrically conductive path between these contacting surfaces upon assembly of the jacketing into a tube.

As is true of the first preferred embodiment of the invention, plastic sheeting 70, 71 remains unattached to the metal barrier layer 60 except along the narrow band junction provided by stitching or the like 73. This is of importance because leaving the metal components free to twist, flex and move relative to one another without hindrance from plastic material 70, 71. As will be apparent from FIGURE 7, the pleats or folds crosswise of strip 64 also facilitate flexing and twisting of the assembled jacket.

Desirably, inner layer 70 is formed of electrically conductive plastic sheeting commercially available in the marketplace and having excellent electrical conducting properties. This sheet, as well as sheet 71, is soft, supple and readily flexible but outer layer 71 preferably has excellent electrical insulating properties and is impervious to fluids. Although the inner sheet need not be made of electrically conductive material, use of conductive sheeting is advantageous in expediting grounding of all stray currents present in any of the individual components of the barrier layer. Whether the inner sheet 70 is made of non-conducting or conducting material, it serves as a buffer between the sharp edges of the barrier layer and components of the cabling being enclosed. Otherwise, these edges might damage or even cut through the protective coating carried by conductors of the cabling.

Components of the jacketing are held assembled about the cabling by suitable ties and preferably by fluid-tight plastic seam-forming tapes 21', 22' identical with those described above. The mounting web of tape 21' is heat-fused or bonded at 24' to outer jacketing sheet 71 along a longitudinal band spaced well inwardly from stitching 73. The mounting web of tape 22' is similarly bonded to the other lateral edge of outer jacket 71. It will therefore be appreciated that in its closed position, seam 23' is spaced inwardly from the stitching 73 and from the free edge of the metal strip 64. This position of tape 21' with respect to the free edge of strip 64 provides the workman with a clear view of this free edge during assembly of the jacketing about cabling in order that he may assure that the ends of fingers 63 are properly assembled either against the interior or exterior surface of strip 64. As illustrated in FIGURE 6, the fingers are pressed against the inner surface of strip 64, but other users prefer to have them bear against the exterior surface and to use the snug-fitting outer jacket 71 to hold them resiliently engaged in this manner. It is also pointed out that the free edge 75 of inner plastic jacketing 70 may terminate to the right of the free ends of fingers 63, as viewed in FIGURE 6, to avoid any possibility of this material becoming sandwiched between fingers 63 and the upper surface of metal strip 64. Even though the inner plastic layer is electrically conductive, it is desirable to have direct wiping contact between fingers 63 and strip 64 for maximum and most efficient shielding results.

FIGURE 5 shows a pair of concentrically assembled jacket assemblies 11', 12', it being pointed out that outer jacketing assembly 12' is constructed in the same manner and of the same components as just described in connection with inner jacket assembly 11' with the exception that the metal layer 60' may, if desired, be of a different metal selected for its effectiveness as a barrier against noise frequencies of a different range than the metal used as the barrier layer for inner assembly 11. Thus, it is to be understood that the metal layers of jackets 11', 12' may be Co-Netic, Netic, copper, aluminum, or other metal, depending upon the particular frequencies and noise conditions sought to be guarded, restricted or barred from a given zone or space.

While it appears that there is appreciable spacing between the two assemblies in both FIGURES 1 and 5, it is pointed out that this spacing has been illustrated primarily for purposes of clarity in showing the components and that in the usual operating environment the multiple jacketing assemblies are so designed and proportioned to fit snugly against both the structure being enclosed and inner ones of the jacketing assemblies.

Desirably, the shielding metal layer is at least 2 mils thick with highly satisfactory results being achieved with thicknesses of 3 or 4 mils. Greater thicknesses can be used but it is seldom necessary to use metal of 6 or 8 mils thick except under severe operating conditions or with large-size assemblies.

It is also pointed out that the present invention is useful for many other purposes than the electrical shielding of cables and the like. Thus, in addition to these functions the metal employed in forming the metal shells is highly effective in providing protective armor for the cable as well as protecting it against abrasion while being handled and dragged across the ground in normal usage, and this is particularly true of the tough and high-strength Netic and Co-Netic metals.

From the foregoing it will be appreciated that the present invention provides a highly versatile jacketing assembly which may be used in various manners either with or without an exterior insulation covering. Furthermore, the jacketing assemblies may be used individually or in multiple as desired and as necessary to provide protection against a single range of frequencies or against a much wider range merely by employing jackets of the requisite metallic materials to embrace the particular range of frequencies likely to be encountered in the operating environment.

While the particular detachable tubular jacketing herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. Longitudinally seamed tubular jacketing effective as a barrier to the passage therepast of electrical fields and adapted to be closed into a tube about cables, conductors and the like elongated components from one side thereof, said jacketing comprising a long thin narrow flexible metal assembly including a plurality of metal fingers in overlapping electrically-conducting contact with one another crosswise thereof and secured firmly together along one lateral edge of said long narrow assembly, said flexible overlapping fingers being readily curled into axially-aligned partially-nesting split rings for encircling cabling and the like with the opposite end margins of individual fingers in overlapping metal-to-metal contact to provide a tubular metal shield capable of wide-range flexing axially of said tubular shield without opening a gap between the overlapping margins of the opposite lateral edges of said fingers, and means for holding said jacketing assembled as an elongated tube with the juxtaposed overlapping margins of said fingers in metal-to-metal contact both circumferentially and longitudinally of said tubular jacketing.

2. Tubular jacketing as defined in claim 1 characterized in that said metal fingers are attached to one another transversely of one end thereof by a strip of folded metal secured to each of said fingers.

3. Flexible tubular jacketing split lengthwise thereof and adapted to be wrapped circumferentially about cabling and the like from one side thereof and effective as a barrier against the passage therethrough of electrical fields and adapted to be assembled into a tube capable of wide range flexing, said tubular jacketing comprising a series of similar rings each split transversely thereof and formed of thin flexible sheet metal, said rings having both their transverse and circumferential margins in resilient overlapping metal-to-metal wiping electrical contact with one another and with the adjacent rings respectively, and flexible means extending longitudinally and circumferentially of said metal rings for holding the same in assembled position about cabling while permitting their overlapped margins to shift as necessary for flexing of said tubular jacketing while remaining in electrically-conductive contact with one another lengthwise of said jacketing.

4. Flexible tubular jacketing adapted to be wrapped circumferentially about cabling and the like from one side thereof and effective as a barrier against the passage therethrough of electrical fields, said tubular jacketing comprising a plurality of split ringlets formed from thin resilient flexible sheet metal having their opposite axial margins and their opposite transverse margins in wiping overlapping metal-to-metal electrically-conductive contact, means extending across said ringlets and embracing the same for holding said ringlets movably assembled about cabling and the like and free to shift relative to one another to permit flexing and twisting of said cabling to a limited degree with adjacent margins of said ringlets remaining in contact to provide a substantially continuous metal barrier to flux.

5. Tubular jacketing as defined in claim 4 characterized in the provision of an interior layer of flexible sheet plastic having a width substantially less than the girth of said ringlets and underlying said ringlets, means attaching one lateral edge of said sheet plastic crosswise of but inwardly from one transverse margin of said ringlets with the remaining juxtaposed surfaces thereof and of said ringlets in contact but substantially unattached to one another, and the other lateral margin of said plastic sheet being spaced inwardly from the other transverse end margins of said ringlets so as not to interfere with metal-to-metal contact of said ringlet end margins with one another.

6. Tubular jacketing as defined in claim 5 characterized in that the means for holding said metal ringlets assembled as a tube includes an outer longitudinally seamed jacket of nonconductive flexible sheet material attached along one lateral edge thereof to said metal ringlets primarily only along a narrow band spaced inwardly from one of the transverse end margins of said metal ringlets, said outer seamed jacket having a pair of nonmetallic fluid-tight interlocking seam forming tapes bonded to the opposite lateral edge portions of said outer jacket and effective when mated to hold said tubular jacket assembled in tubular form with all overlapping margins of said ringlets in firm but relatively movable wiping metal-to-metal contact.

7. Tubular jacketing as defined in claim 4 characterized in that said series of ringlets merges in overlapping relation at one end of said series with the end of a relatively long longitudinally split metal tube thereby providing a tubular jacket with portions of quite different flexing characteristics with the respective portions thereof adapted to be applied about cabling some portions of which have no need for flexing and other portions of which have need for flexing.

8. Tubular jacketing adapted to be wrapped circumferentially about cabling and the like from one side thereof and effective as a barrier against the passage of electrical fields and having portions of its length substantially more flexible than other portions, said assembled jacketing including first and second overlapping sections, said first section comprising a long narrow strip of thin flexible metal formed into a longitudinally split tube and said second section comprising a series of transversely split ringlets of sheet metal having their opposite end margins in overlapping metal-to-metal wiping electrical contact with one another, said ringlets and said split tube including means for holding the same assembled along one edge to form a metal tubular jacket with all adjacent margins in overlapping metal-to-metal contact and wherein said second section is relatively flexible in contrast with said first section.

9. A tubular jacket assembly for use as a barrier against the passage of electrical flux fields and adapted to be assembled in a tube about cabling and bundles of conductors and the like from one side thereof, said assembly comprising a flexible barrier layer formed by a series of wide thin flexible transversely split ringlets of resilient metal effective as a barrier against the passage of flux of the frequency band sought to be barred, an outer layer of flexible electrically nonconductive material positioned loosely against one side of said ringlets and having one of its lateral edges attached to said ringlets transversely thereof along a band spaced inwardly from one transverse end of said ringlets with substantially all other juxtaposed surface areas thereof free of attachment to said ringlets, and fluid-tight seam-forming means along the opposite lateral edge portions of said outer layer mateable to hold said assembly assembled as a tube with the transverse end margins of said ringlets in overlapping metal-to-metal contact.

10. A flux shield effective as a barrier against the passage therethrough of flux fields having a frequency ranging generally between 10 and 100 kilocycles, said flux shield being adapted to be curled into a seamed tube about conductors and the like and comprising a plurality of superimposed elongated strips, means holding said strips permanently attached together lengthwise thereof and along a narrow band junction area and substantially unattached to one another throughout the remainder of their juxtaposed surface areas so as to be axially movable relative to one another through a limited range as said seamed tube is flexed through an arc extending lengthwise of said seamed tube, the outer one of said strips comprising supple and flexible nonconductive impervious sheet material, seam-forming tapes secured along the opposite lateral edge portions of said outer strip, said tapes being of nonconductive material and having interlocking tongues and grooves mateable with one another to hold said jacketing assembled as a tube, the inner one of said strips being formed of conductive sheet metal not in excess of five mils thick and effective as a barrier for flux fields having a frequency in the range of 10 to 100 kilocycles, said inner strip being sufficiently wide that the opposite margins thereof lengthwise of said seamed tube are in overlapping contact with one another when curled into tubular form thereby to provide a tube having a continuous annular electrically conductive barrier shield.

11. A flux shield as defined in claim 10 characterized in the inclusion of a third flexible strip of pliant nonmetallic material located against the interior side of said metal strip and attached thereto along a narrow band directly opposite the aforesaid narrow-band junction holding said first-mentioned two strip assembled to one another, said third strip having a width narrower than said metal strip and having its lateral margins spaced inwardly of the lateral margins of said metal strip to avoid interfering with metal-to-metal contact between the opposite lateral margins of the latter strip as said flux shield is assembled into a tube.

References Cited by the Examiner

UNITED STATES PATENTS

| | | | |
|---|---|---|---|
| 663,570 | 12/1900 | Haviland et al. | 138—139 |
| 1,101,561 | 6/1914 | McPhayden | 193—25 X |
| 2,585,054 | 2/1952 | Stachura | 174—68 X |
| 2,756,172 | 7/1956 | Kidd | 138—128 X |
| 2,960,561 | 11/1960 | Plummer | 138—168 X |

FOREIGN PATENTS 560,270    3/1944    Great Britain.

LAVERNE D. GEIGER, *Primary Examiner.*

LEWIS J. LENNY, *Examiner.*